(No Model.) 2 Sheets—Sheet 1.
A. K. SHERWOOD.
SUPPORTING ATTACHMENT FOR BICYCLES.
No. 514,044. Patented Feb. 6, 1894.
*Fig. 1.* *Fig. 2.*
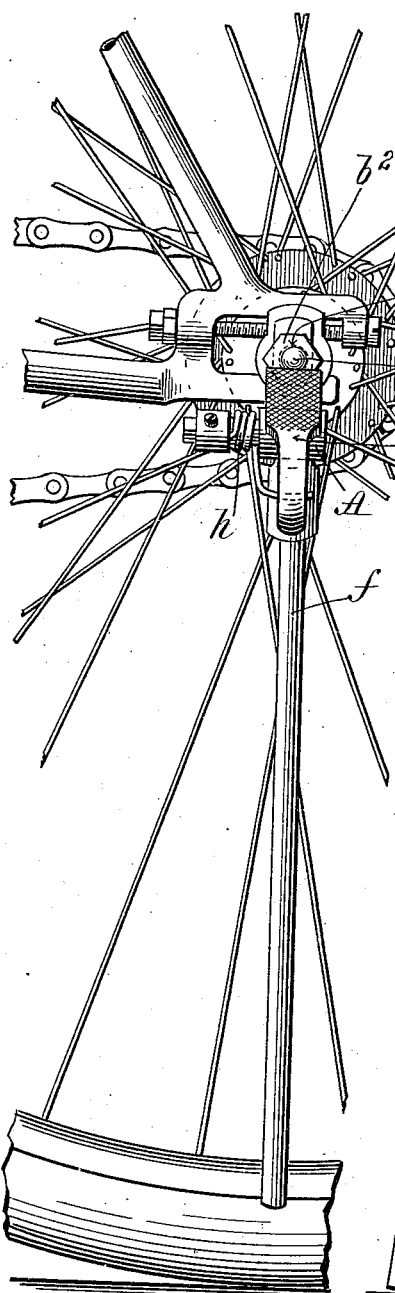
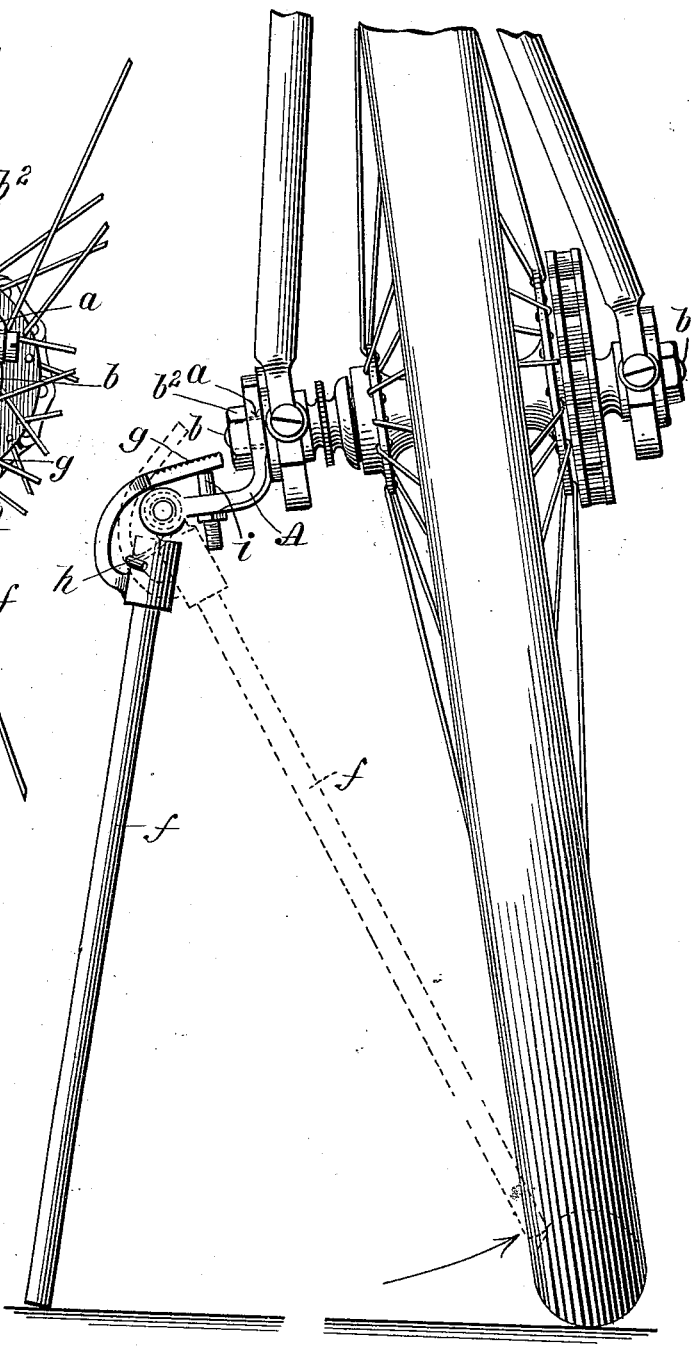
Witnesses:
J. D. Garfield
J. Bordiker
Inventor
Arthur K. Sherwood,
by Chapin & Co
Attorneys.

(No Model.) 2 Sheets—Sheet 2.

A. K. SHERWOOD.
SUPPORTING ATTACHMENT FOR BICYCLES.

No. 514,044. Patented Feb. 6, 1894.

Witnesses:
J. D. Garfield
J. Boedeker

Inventor:
Arthur K. Sherwood,
by Chapin & Co.
Attorneys.

THE NATIONAL LITHOGRAPHING COMPANY,
WASHINGTON, D. C.

UNITED STATES PATENT OFFICE.

ARTHUR K. SHERWOOD, OF THOMPSONVILLE, CONNECTICUT.

SUPPORTING ATTACHMENT FOR BICYCLES.

SPECIFICATION forming part of Letters Patent No. 514,044, dated February 6, 1894.

Application filed September 29, 1893. Serial No. 486,783. (No model.)

*To all whom it may concern:*

Be it known that I, ARTHUR K. SHERWOOD, a citizen of the United States, residing at Thompsonville, in the county of Hartford and State of Connecticut, have invented new and useful Improvements in Supporting Attachments for Bicycles, of which the following is a specification.

The object of this invention is to provide a device for supporting a bicycle in an upright position, when the wheel is not being ridden—which is attachable to the bicycle and may be regarded as a part thereof—but which, nevertheless, is so constructed and arranged as to constitute practically no encumbrance, and which is easily operated so as to be brought into its supporting position.

Reference is to be had to the accompanying two sheets of drawings in which the invention is fully and clearly illustrated, and in which—

Figure 3:
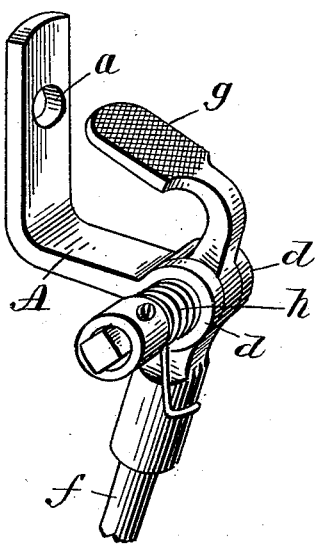
Figure 4:
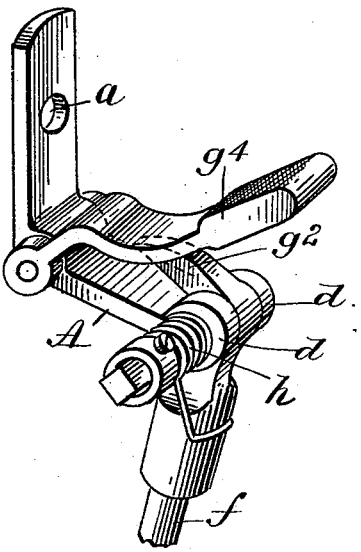
Figure 5:
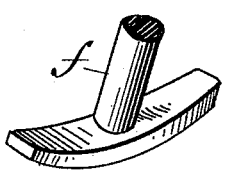

Figure 1 is a side elevation of a part of the rear wheel and rear framing of a safety bicycle and of the supporting device applied thereto. Fig. 2 is a rear elevation of the same with the device in its wheel-supporting position. Figs. 3 and 4 are perspective views of the supporting device or attachment, they differing, with respect to subordinate features of construction, slightly from each other and from the form shown in the preceding views. Fig. 5 represents in perspective a foot piece with which the support-leg may be provided.

Similar characters of reference indicate corresponding parts in all of the views.

The device comprises a rigid rod or bar which is adapted to be pivotally supported upon a stationary part of the machine at a suitable distance from the ground, with a leg or member thereof capable of being swung out from its normal position close to the machine laterally, and at an inclination to the median vertical plane of the machine.

Referring to the drawings, A represents the bracket or holder of the attachment, the same consisting of a right angular metallic part the vertical member having the hole, $a$, to fit over the end of the rear wheel axle, $b$, to be retained thereon by usual axle nut, $b^2$,—while the horizontal member has the ear pieces, $d$, $d$, in which is pivotally hung the supporting leg, $f$. A spring, $h$, is applied between the leg and the pivotal supporting part for maintaining the leg inwardly near the rim, for instance, as indicated in Fig. 2. The leg has a projection, $g$, which extends from its outer side below the pivot upwardly and inwardly to constitute a foot-lever whereby to throw the support-leg outwardly against the spring, as the rider dismounts, the bicycle being canted toward the supporting-leg side. It is preferred to have a stop-pin, $i$, for limiting the outward throw of the support-leg, the same stop being adaptable as well for limiting the inward disposition thereof so that the leg may not be in frictional contact with the inner part of the rim or tire. As shown this stop is adjustable, vertically, through the horizontal member of the bracket being constituted with a screw-shank. The operating lever, $g$, comes to limiting contact upon the upper end of the stop-pin when the support is thrown out, while the hub on the leg, just below the pivot, comes to sidewise bearing on the lower extremity of the pin as the support-leg is permitted to be inwardly spring-pressed when the machine is brought upright. The spring should not be so strong as to force the leg inwardly when the machine leans sidewise on the latter, and yet a spring should be employed which will hold the device against rattling when the machine is being ridden.

In Fig. 3 the operating lever, $g$, is shown as extended directly from the upper pivoted end of the leg upwardly and inwardly, while in Fig. 4 the lever projection, $g^2$, upwardly and inwardly extended, instead of being acted upon directly by the foot, is operated through the second lever, $g^4$, pivoted at the elbow of the bracket and outwardly and upwardly extended, and bearing on the lever projection, $g^2$. The compound lever, last specified, may be deemed preferable by some persons, as less power is required to throw out the support.

If desired, the support member may be swung up alongside of one of the framing or fork-tubes of the machine, it being articulated at its place of connection so as to be brought down and outwardly into its supporting position when necessary.

By the equipment of the machine with a movable support, substantially as described, it may be rendered self-supporting, anywhere, as in the street, without dependence on a curbing, fence, or building, in a warehouse or salesroom.

Having thus described my invention, what I claim, and desire to secure by Letters Patent, is—

1. The combination with the fixed axle of one of the bicycle wheels, of the bracket, A, having a perforated vertical member to fit and be secured on a projecting end of the axle and having an outwardly extended member, of a support leg hung on said latter member and constrained for a swinging movement only in a vertical plane transversely of the median plane of the adjacent wheel, a stop, or shoulder, provided for limiting the inward swing of the leg whereby it may remain in proximity to, but free from, the wheel-rim near the tread, a spring for normally maintaining the leg in its so-swung position, and a lever arranged adjacent said wheel-axle for receiving a foot pressure to throw the leg outwardly, substantially as described.

2. The combination with the rear wheel axle, of the bicycle, of the angular bracket having the member with the hole fitted and secured by the nut upon the axle and having the leg pivotally hung to its horizontal member with the lever projection, the spring and the stop-pin screw-adjustable through and extended above and below the horizontal bracket member serving as a stop to limit both the outward throw and inward swing of the leg, substantially as shown.

ARTHUR K. SHERWOOD.

Witnesses:
GEORGE BORLAND,
TUDOR GOWDY.